(12) United States Patent
Hunter et al.

(10) Patent No.: US 9,574,542 B2
(45) Date of Patent: Feb. 21, 2017

(54) TURBINES

(75) Inventors: Scott Hunter, New South Wales (AU); Ali Mohammad Baghaei Nanehkaran, New South Wales (AU)

(73) Assignee: Wave Power Renewables Limited, Hong Kong (CN)

( * ) Notice: Subject to any disclaimer, the term of this patent is extended or adjusted under 35 U.S.C. 154(b) by 1193 days.

(21) Appl. No.: 13/991,241

(22) PCT Filed: Dec. 3, 2010

(86) PCT No.: PCT/AU2010/001638
§ 371 (c)(1),
(2), (4) Date: Jul. 23, 2013

(87) PCT Pub. No.: WO2011/066625
PCT Pub. Date: Jun. 9, 2011

(65) Prior Publication Data
US 2013/0309071 A1    Nov. 21, 2013

(30) Foreign Application Priority Data

Dec. 4, 2009  (AU) ................ 2009905936

(51) Int. Cl.
F03B 13/22  (2006.01)
F03B 15/06  (2006.01)
F03B 15/02  (2006.01)

(52) U.S. Cl.
CPC .............. F03B 15/06 (2013.01); F03B 13/22 (2013.01); F03B 15/02 (2013.01); F05B 2210/404 (2013.01); Y02E 10/38 (2013.01)

(58) Field of Classification Search
None
See application file for complete search history.

(56) References Cited

U.S. PATENT DOCUMENTS

| 4,258,269 A | 3/1981 | Tsubota |
| 4,385,492 A | 5/1983 | Lee |
| 4,629,904 A * | 12/1986 | Rojo, Jr. ............... F03B 13/086 290/1 R |
| 5,588,293 A | 12/1996 | Nozu |

(Continued)

FOREIGN PATENT DOCUMENTS

| FI | WO 2009034225 A1 * | 3/2009 | ............. F03B 13/08 |
| GB | 2330625 A | 4/1999 | |

(Continued)

OTHER PUBLICATIONS

International Search Report and Written Opinion for Application No. PCT/AU2010/001638 dated Jan. 31, 2011.

(Continued)

Primary Examiner — Igor Kershteyn
Assistant Examiner — Justin Seabe
(74) Attorney, Agent, or Firm — Alston & Bird LLP

(57) ABSTRACT

This invention relates to a turbine for extracting energy from an oscillating working fluid. The turbine includes a housing defining a flow passage for the working fluid. An energy conversion unit is disposed in the housing. Flow control means is selectively movable to occlude a predetermined portion of the flow passage such that the working fluid is directed to act on a certain section of the energy conversion unit.

25 Claims, 11 Drawing Sheets

(56) References Cited

U.S. PATENT DOCUMENTS

| | | | |
|---|---|---|---|
| 7,525,213 B2 * | 4/2009 | Nagata | F03B 13/142 290/53 |
| 2004/0163387 A1 | 8/2004 | Pineda | |
| 2008/0088133 A1 | 4/2008 | Nagata et al. | |

FOREIGN PATENT DOCUMENTS

| | | | |
|---|---|---|---|
| JP | 60-090990 A | 5/1985 |
| JP | 2064270 A | 3/1990 |
| JP | 10-176649 A | 6/1998 |
| JP | 2003-120499 A | 4/2003 |

OTHER PUBLICATIONS

International Preliminary Report on Patentability for Application No. PCT/AU2010/001638 dated Mar. 26, 2012.

\* cited by examiner

TURBINES

FIELD OF THE INVENTION

The present invention relates generally to energy conversion devices and in particular to turbines.

The invention has been developed primarily for use in an ocean wave energy extraction system employing an oscillating water column and will be described hereinafter with reference to this application. However, it will be appreciated that the invention is not limited to this particular filed of use.

BACKGROUND OF THE INVENTION

With an ever increasing concern of the impact traditional energy systems have had or are having on the environment, new methods and systems are currently being developed for reducing the impact such systems have on the environment.

A number of these systems rely on turbines to rotate an electric generator in order to produce electricity. The problem with many such systems proposed to date is that a significant capital outlay is required to set up a new system. The extent of this capital outlay can often act as a deterrent to investors, as the return on investment is limited to some extent by the relationship between the capital outlay and the efficiency of the system.

The turbines currently employed in such systems operate at a relative low efficiency and the energy extraction system as a whole is limited by the efficiency of these turbines.

It is an object of the present invention to overcome or ameliorate one or more of the disadvantages of the prior art, or at least to provide a useful alternative.

SUMMARY OF THE INVENTION

According to a first aspect of the invention, there is provided a turbine for extracting energy from an oscillating working fluid, the turbine including:

a housing defining a flow passage for the working fluid;
an energy conversion unit disposed in the housing; and
flow control means, the flow control means being selectively movable to occlude a predetermined portion of the flow passage such that the working fluid is directed to act on a certain section of the energy conversion unit.

Preferably, the flow control means is movable to change the configuration of the flow passage between a first configuration in which the flow control means occludes a first portion of the flow passage such that the working fluid can act on a first operating section of the energy conversion unit, and a second configuration in which the flow control means occludes a second portion of the flow passage such that the working fluid can act on a second operating section of the energy conversion unit.

The turbine of the invention is particularly suited for use in an ocean wave energy extraction system, wherein the working fluid is an oscillating airflow generated by an oscillating water column of the ocean wave energy extraction system, the oscillating water column (and thus the airflow) oscillating in response to the rise of fall of passing ocean waves.

Preferably, the energy conversion unit includes a rotor supported for rotation within the flow passage. The rotor is preferably adapted for rotation in a single direction, independent of the direction of fluid flow. Preferably, the rotor is arranged to be substantially normal to the direction of fluid flow.

The rotor preferably has a central hub and a plurality of blades arranged about and extending from the periphery of the hub such that the plurality of blades are disposed within the flow passage. Each blade preferably has a pressure side surface and a suction side surface. Preferably, each pressure side surface is concave. Each suction side surface is preferably convex.

The first operating section of the energy conversion unit is preferably a predetermined portion of the rotor. In certain embodiments, the first operating section is a predetermined number of sequential blades. In other embodiments, the first operating section is a predetermined circumferential extent of the rotor.

The flow passage preferably has a cross-section in the form of an annulus. In the first configuration, the flow control mechanism preferably occludes a portion of the annulus at the intake end to define an intake opening through which working fluid flowing in the first direction can pass to act on the first operating section of the rotor.

Preferably, a first stator or nozzle is disposed on a first side of the rotor for directing working fluid flowing in the first direction towards the pressure side of the blades of the rotor. In one preferred embodiment, the first stator or nozzle includes a plurality of guide vanes arranged so as to have a circumferential extent of approximately 180 degrees around the annulus of the flow passage.

The flow control mechanism preferably includes means for changing the configuration of an inlet opening of the flow passage between a first configuration wherein a first inlet opening is defined such that the working fluid can act on the first operating section, and a second configuration wherein a second inlet opening is defined such that the working fluid can act on the second operating section. The inlet and outlet openings are preferably arranged on opposite sides of the rotor.

In certain embodiments, the flow control mechanism preferably includes a first gate or valve-type mechanism associated with the circumferential extent of the flow passage which is not covered by the first stator, the first gate-type mechanism being movable between an open position and a closed position in which the working fluid is admitted to the rotor only through the open nozzle section.

Preferably, a second stator or nozzle is disposed on an opposite second side of the rotor for directing working fluid flowing in the second direction towards the pressure side of the blades of the rotor. In one preferred embodiment, the second stator or nozzle includes a plurality of guide vanes arranged so as to have a circumferential extent of approximately 180 degrees around the annulus of the flow passage.

In certain embodiments, the flow control mechanism preferably includes a second gate or valve-type mechanism associated with the circumferential extent of the flow passage on the second side which is not covered by the second stator, the second gate-type mechanism being movable between a open position and a closed position in which the working fluid is admitted to the rotor only through the open nozzle section.

In other preferred embodiments, the flow control mechanism includes a rotatable disc for occluding a portion of the inlet opening of the flow passage. Preferably, a rotatable disc is provided on each side of the energy conversion means for occluding a portion of each inlet opening of the flow passage. The rotatable discs are preferably semi-circular. Preferably, the discs are offset by 180 degrees relative to each other. Both discs preferably rotate simultaneously through 180 degrees to each other in response to changes in the direction of fluid flow from the first flow direction to the second flow direction, such that the working fluid can act on the first and second operating sections, respectively.

According to a second aspect of the invention, there is provided a turbine for extracting energy from an oscillating working fluid, the turbine including:
- a housing defining a flow passage for the working fluid;
- an energy conversion unit disposed in the housing, the energy conversion unit having a first operating section and a second operating section; and
- flow control means for changing the configuration of the flow passage between a first configuration in which the working fluid can act on the first operating section when the working fluid is flowing in a first predetermined direction, and a second configuration in which the working fluid can act on the second operating section when the working fluid is flowing in a second predetermined direction.

According to a third aspect of the invention, there is provided a turbine for extracting energy from an oscillating working fluid, the turbine including:
- a housing defining a flow passage for the working fluid;
- an energy conversion unit disposed in the housing; and
- flow control means for selectively changing the configuration of the flow passage between an active configuration in which the working fluid acts on the energy conversion unit, and a bypass configuration in which the working fluid bypasses the energy conversion unit.

In certain preferred embodiments, the energy conversion unit includes a first energy conversion module and a second energy conversion module. The first energy conversion module is preferably adapted to operate in response to the working fluid flowing in a predetermined first direction. The second energy conversion module is preferably adapted to operate in response to the working fluid flowing in a predetermined second direction.

Preferably, the flow control means enables the active configuration of the flow passage to be selectively changed between a first active configuration wherein the working fluid acts on the first energy conversion module and bypasses the second energy conversion module, and a second active configuration wherein the working fluid acts on the second energy conversion module and bypasses the first energy conversion module.

The housing is preferably longitudinal and extends along a longitudinal axis. In certain embodiments, the housing is arranged such that its longitudinal axis is arranged substantially parallel to the direction of flow of the oscillating working fluid. In other embodiments, the housing is arranged such that its longitudinal axis is arranged substantially normal to the direction of flow of the oscillating working fluid.

For example, in certain embodiments, the housing could be arranged such that the longitudinal axis is substantially vertical. In other preferred forms, the housing could be arranged such that the longitudinal axis is substantially horizontal. It will be appreciated by those skilled in the art that the housing is not limited to those orientations described above, but could be arranged in any other suitable orientation, relative to the direction of flow of the working fluid, to suit a particular application.

Preferably, the first energy conversion module and second energy conversion module are axially spaced apart from each other. The first and second energy conversion modules are preferably arranged substantially coaxially along the longitudinal axis of the housing.

In one preferred embodiment, the housing has a generally cylindrical body. The housing preferably includes an inner frame and an outer frame. Preferably, the inner and outer frames are arranged relative to each other, such that the void or space therebetween forms at least a portion of the flow passage. The void or space between the inner and outer frames preferably forms a central passage of the flow passage.

Preferably, the inner frame and the outer frame of the housing are arranged substantially concentrically about the longitudinal axis such that a cross-section of the flow passage, more particularly a cross-section of the central or main passage, is in the form of an annulus.

Preferably, the housing has a first bypass section associated with the first energy conversion module, and a second bypass section associated with the second energy conversion module. The first bypass section preferably bounds the first energy conversion module to define a first bypass passage for the working fluid to flow around (or otherwise not act on) the first energy conversion module. The second bypass section preferably bounds the second energy conversion module to define a second bypass passage for the working fluid to flow around (or otherwise not act on) the second energy conversion module.

Preferably, the flow control means has a first gate-type mechanism movably disposed within the housing for opening and closing the first bypass passage. The flow control means preferably has a second gate-type mechanism movably disposed within the housing for opening and closing the second bypass passage. In some preferred embodiments, the first and second gate-type mechanisms include a plurality of gate members hingedly connected to the outer frame of the housing, each gate member being movable from a first position substantially flush with the outer frame to close the associated bypass passage, and a second position extending across the annulus of the flow passage to open the bypass passage. Preferably, the plurality of gate members are arranged in a polar array.

In certain preferred embodiments, the first gate-type mechanism includes an upstream set of gate members and a downstream set of gate members arranged on respective upstream and downstream sides of the first energy conversion module.

The second gate mechanism preferably includes an upstream set of gate members and a downstream set of gate members arranged on respective upstream and downstream sides of the second energy conversion module. It will be appreciated that the terms "upstream" and "downstream" are used in a relative sense, dependent upon the direction of flow of the oscillating working fluid.

It will also be appreciated by those skilled in the art that the flow control mechanism is not limited to the hinged gate-type mechanism described above, but could be any suitable occluding means for occluding one or more sections of the flow passage such as, for example, an arrangement of flow control valves to enable the configuration of the flow passage to be changed.

Preferably, each energy conversion module has a rotor supported for rotation about the longitudinal axis of the housing. The rotors of the first and second energy conversion modules are preferably coaxially aligned.

Preferably, each rotor has a central hub and a plurality of blades arranged about and extending from the periphery of the hub. Each rotor is preferably arranged such that the plurality of blades are disposed within the flow passage, more particularly, within the central passage between the inner and outer frames of the housing.

The plurality of blades of each rotor are preferably configured such that each rotor rotates in a predetermined direction. Preferably, each rotor is arranged substantially normal to the flow direction of the working fluid such that each rotor rotates about the longitudinal axis of the housing. In other preferred forms, each rotor is arranged to rotate in a direction substantially parallel to the fluid flow direction. In one preferred embodiment, the rotor of the first energy conversion module and the rotor of the second energy conversion module are arranged to rotate in the same direction.

Preferably, each rotor blade has a generally crescent-shaped or arcuate cross-sectional profile. Each crescent-shaped blade preferably has a converging concavo-convex form, including a concave surface and a convex surface.

Preferably, the cross-sectional profile of each crescent-shaped blade converges such that each blade has substantially parallel outer tip edges. The outer tip edges of each blade preferably have a smooth contoured profile or an otherwise rounded profile, devoid of sharp or pointed edges. In certain embodiments, each outer tip edge has a predetermined radius of curvature.

In certain embodiments, each energy conversion module includes an inlet stator which is arranged adjacent to the associated rotor for directing the working fluid towards the rotor. It will be appreciated that the inlet stator is adapted to deviate the course or flowpath of the working fluid to facilitate rotation of the associated rotor in the predetermined direction.

Preferably, each stator has a plurality of guide vanes for directing the working fluid towards, and so as to act on, the concave surfaces of the rotor blades, such that the convex surface leads the concave surface when the associated rotor rotates, in use.

Each stator is preferably arranged such that the plurality of guide vanes are disposed within the flow passage, more particularly, within the central passage between the inner and outer frames of the housing. The guide vanes are preferably arranged so as to be substantially normal to the direction of fluid flow. Preferably, the plurality of guide vanes of each stator are arranged in a polar array, preferably about the longitudinal axis of the housing.

Preferably, the stator associated with the first energy conversion module is arranged towards an inlet end of the housing, such that this stator is downstream of the first rotor when the working fluid is flowing in the first direction. Preferably, the stator associated with the second energy conversion module is arranged towards an exhaust end of the housing, such that this stator is downstream of the second rotor when the working fluid is flowing in the second direction. In one preferred embodiment, the first and second energy conversion units are coaxially aligned with each other such that the rotors of the first and second energy conversion units are intermediate the associated stators.

In some preferred embodiments, each guide vane has a cambered cross-sectional profile. Preferably, the cambered cross-sectional profile of each guide vane is asymmetrical. Each guide vane preferably has an asymmetrical converging concavo-convex form having a concave surface and a convex surface. Preferably, each guide vane is arranged such that the concave surface is incident with the working fluid, when the flow passage is in the relevant active configuration, in use.

Each guide preferably has a leading edge, a midsection, and a trailing edge. The midsection of each vane is preferably closer to the leading edge, than the trailing edge. Each leading edge preferably has a smooth contoured or otherwise rounded profile. Preferably, each trailing edge has a smooth contoured or otherwise rounded profile. The leading and trailing edge of each guide vane is preferably devoid of sharp or pointed edges. In certain preferred embodiments, each leading and trailing edge of the guide vanes has a predetermined radius of curvature. Preferably, the radius of curvature of the leading edge is greater than the radius of curvature of the trailing edge.

It will of course be appreciated that the guide vanes are not limited to the preferred form described above, and could be any suitable shape, including planar shapes, for deviating the direction of fluid flow towards the concave surface of the rotor blades.

However, it is noteworthy that the preferred form of the rotor blades and guide vanes having smooth surfaces and rounded edges provides advantages in terms of increased efficiency and operation of the energy conversion modules, and the turbine as a whole, as an increased amount of working fluid is captured and used to rotate the rotors.

Preferably, each rotor has a drive shaft coupled at its proximal end to the central hub such that rotation of the rotor causes a corresponding rotation of the drive shaft whereby its distal end can be used to engage and drive an electric generator. In some preferred embodiments, the drive shafts associated with the first and second energy conversion modules drive the same electric generator. In certain preferred forms, the electric generator is a double ended generator. The electric generator is preferably disposed in the inner frame of the housing.

The oscillating working fluid is preferably an oscillating airflow. In certain preferred forms of the invention, the airflow is generated by an oscillating water column of an ocean wave energy extraction system, the oscillating water column (and thus the airflow) oscillating in response to the rise of fall of passing ocean waves.

It will, however, be appreciated by those skilled in the art that the oscillating working fluid is not limited to an oscillating airflow, and in particular, is not limited to an oscillating airflow produced from an oscillating water column. For example, in other preferred forms, the oscillating working fluid could be any suitable compressible fluid such as a gas, for example, steam. In other embodiments, the oscillating working fluid could be a non-compressible fluid such as a liquid, for example, water.

According to a fourth aspect of the invention, there is provided a turbine for extracting energy from an oscillating working fluid, the turbine including:

a housing defining a flow passage for the working fluid;
a first energy conversion module disposed in the housing;
a second energy conversion module disposed in the housing; and
flow control means for changing the configuration of the flow passage between a first configuration in which the first energy conversion unit is operable and the second energy conversion unit is inactive, and a second configuration in which the second energy conversion unit is operable and the first energy conversion unit is inactive.

According to a fifth aspect of the invention, there is provided a turbine including:

a rotor having a central hub; and
a plurality of blades disposed about the hub, wherein each blade has a generally crescent-shaped or arcuate cross-sectional profile.

Each crescent-shaped blade preferably has a converging concavo-convex form, including a concave surface and a convex surface. Preferably, the blades are arranged about the hub such that concave surfaces are configured as a pressure side of the blades, and the convex surfaces are configured as the suction side of the blades.

Preferably, the cross-sectional profile of each crescent-shaped blade converges such that each blade has substantially parallel outer tip edges. The outer tip edges of each blade preferably have a smooth contoured profile or an otherwise rounded profile, devoid of sharp or pointed edges. In certain embodiments, each outer tip edge has a predetermined radius of curvature.

Each rotor blade is preferably symmetrical.

In certain embodiments, the turbine includes an inlet stator having a plurality of guide vanes arranged adjacent to the rotor for directing the working fluid towards the pressure side of the rotor blades. The inlet guide vanes preferably direct the working fluid towards the rotor blades at a predetermined or desired flow angle. It will be appreciated that the inlet stator is adapted to deviate the course or flowpath of the working fluid to facilitate rotation of the associated rotor in the predetermined direction.

In some preferred embodiments, the turbine includes an outlet stator which is arranged adjacent to the rotor for directing an exhaust flow away from the rotor.

It will be appreciated that the inlet and outlet stators are configured such that their roles are reversible to facilitate operation with a bidirectional or oscillating fluid flow.

In some preferred embodiments, each inlet and outlet guide vane has a cambered cross-sectional profile. Preferably, the cambered cross-sectional profile of each guide vane is asymmetrical. Each guide vane preferably has an asymmetrical converging concavo-convex form having a concave surface and a convex surface. Preferably, each guide vane is arranged such that the concave surface is incident with the working fluid, when the flow passage is in the relevant active configuration, in use.

Each guide preferably has a leading edge, a midsection, and a trailing edge. The midsection of each vane is preferably closer to the leading edge, than the trailing edge. Each leading edge preferably has a smooth contoured or otherwise rounded profile. Preferably, each trailing edge has a smooth contoured or otherwise rounded profile. The leading and trailing edge of each guide vane is preferably devoid of sharp or pointed edges. In certain preferred embodiments, each leading and trailing edge of the guide vanes has a predetermined radius of curvature. Preferably, the radius of curvature of the leading edge is greater than the radius of curvature of the trailing edge.

In certain embodiments, the rotor blades may be interchangeable with blades of a different profile so as to achieve a different operating characteristic of the turbine. Similarly, the guides vanes of the first and second rotors could, in certain embodiments, be interchangeable.

In some preferred forms, the rotor blades and/or guide vanes are movably mounted to the respective hub. For example, the blades/guide vanes could be hingedly or rotatably mounted to the respective hub so as to change the pitch of the blade relative to the direction of fluid flow.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

Figure 1:
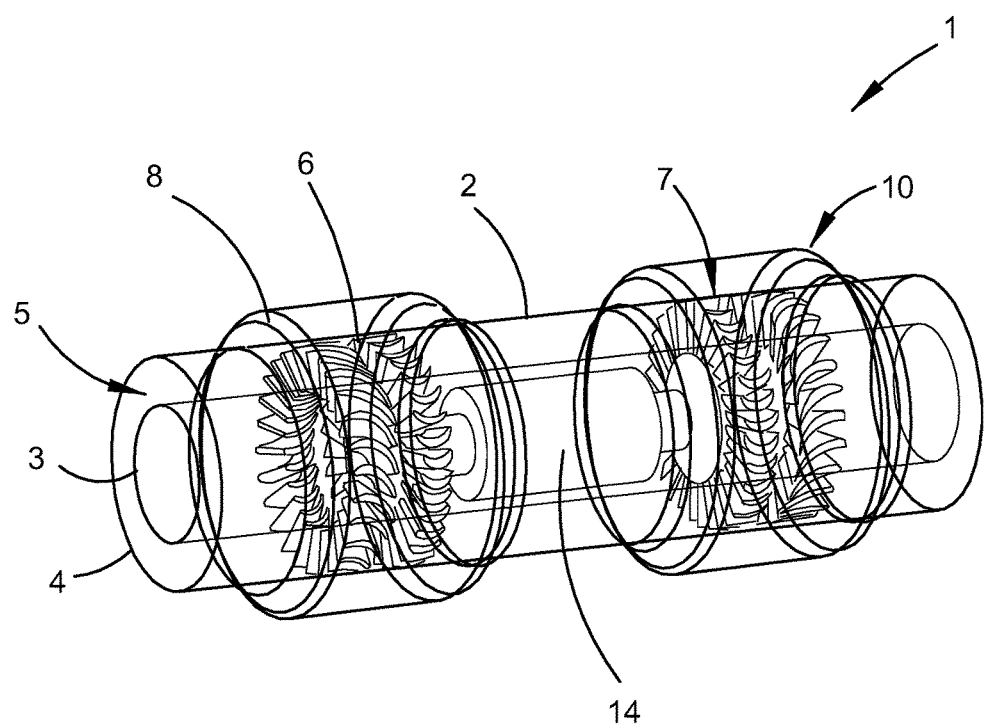
FIG. 1 is a perspective view of one embodiment of a turbine according to the invention.

Referring to the drawings, the invention provides a turbine 1 for extracting energy from an oscillating working fluid in the form of an oscillating airflow. The turbine 1 has been developed specifically for use in an ocean wave energy extraction system (not shown) of the type having an oscillating water column. In such systems, the oscillating water column or OWC is configured to produce the oscillating airflow in response to the rise and fall of passing ocean waves.

The turbine 1 has a longitudinal, generally cylindrical housing 2 having an inner frame 3 and an outer frame 4. The inner and outer frames (3, 4) are arranged concentrically about the longitudinal axis of the housing 2 such that the void or space therebetween forms a central flow passage 5 for the working fluid. The concentric arrangement of the inner and outer frames (3, 4) is such that the cross-section of the central flow passage 5 is in the form of an annulus.

An energy conversion unit having a first energy conversion module 6 and a second energy conversion module 7 is disposed within the housing 2 for extracting energy from the working fluid. The first and second rotor-stator modules (6, 7) are axially spaced apart from each other within the housing 2, and substantially coaxial along the longitudinal axis of the housing 2.

The first energy conversion module 6 is preferably in the form of a stator-rotor module. The first stator-rotor module 6 is adapted to operate in response to airflow in a predetermined first direction. For example, the first stator-rotor module 6 is preferably configured to operate in response to airflows produced from the rise of an ocean wave.

The second energy conversion module 7 is preferably in the form of a stator-rotor module. The second stator-rotor module 7 is adapted to operate in response to the airflow flowing in a predetermined second direction. For example, the second stator-rotor module 7 is preferably configured to operate in response to airflows produced from the fall of an ocean wave.

The housing 2 has a first bypass section 8 bounding the first stator-rotor module 6 to define a first bypass passage 9 for the working fluid to flow around (or otherwise not act on) the first stator-rotor module 6.

A second bypass section 10 bounds the second stator-rotor module 7 to define a second bypass passage 11 for the working fluid to flow around (or otherwise not act on) the second stator-rotor module 7.

A flow control means in the form of a gate- or valve-type mechanism 12 is arranged in the housing 2 for selectively changing the configuration of the flow passage 5 between an active configuration in which the working fluid acts on either the first stator-rotor module 6 or the second stator-rotor module 7, and a bypass configuration in which the working fluid bypasses the energy conversion unit.

A gate-type mechanism 12 is arranged on the upstream and downstream sides of both stator-rotor modules (6, 7). Each gate-type mechanism 12 includes a polar array of gate members 13 hingedly connected to the outer frame 4 of the housing 2. Each gate member 13 is movable from a first position substantially flush with the outer frame 4 to close the associated bypass passage (9, 11), and a second position extending across the annulus of the flow passage to open the associated bypass passage.

Figure 2:
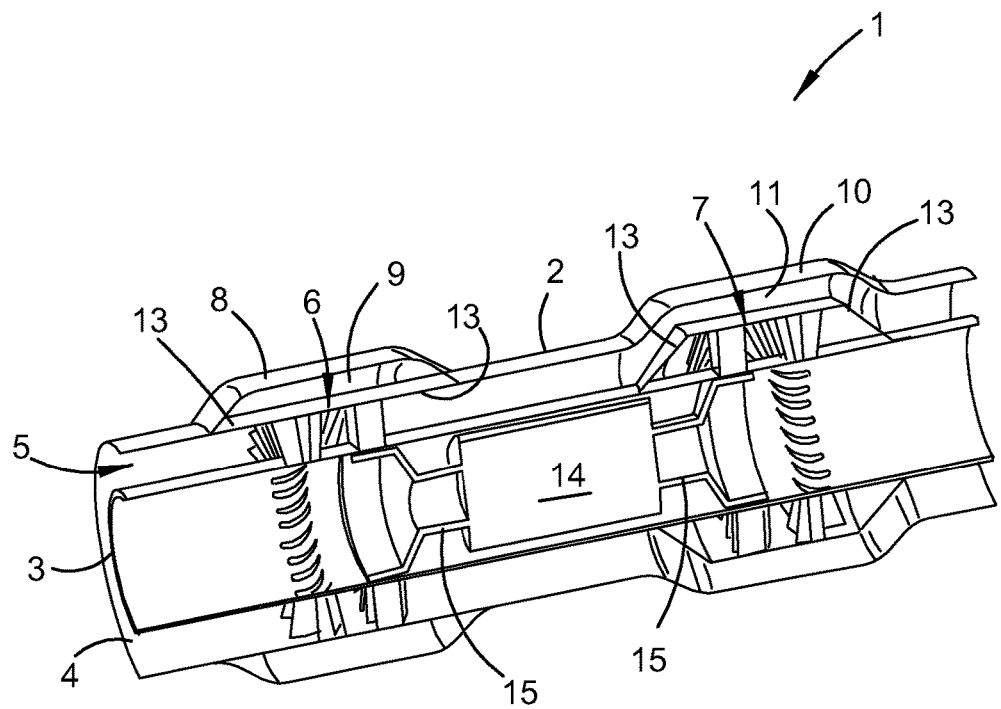
FIG. 2 is a cut-away view of the turbine of FIG. 1 in which the flow passage is in a first active configuration.
Figure 3:
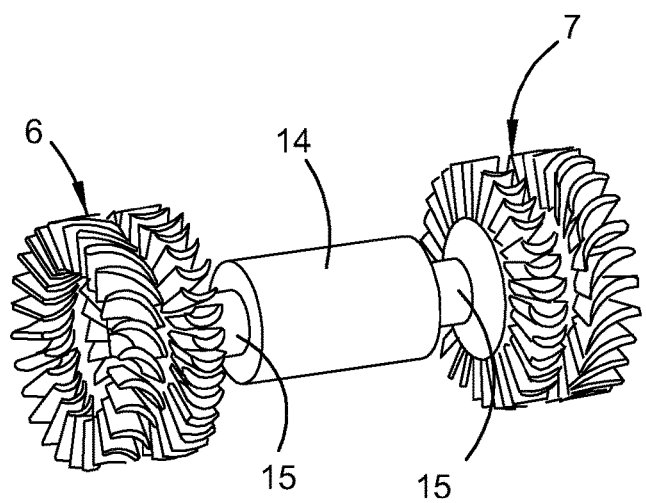
FIG. 3 is perspective view of a first stator-rotor energy conversion module and a second stator-rotor energy conversion module coupled to a doubled ended electric generator.
Figure 4:
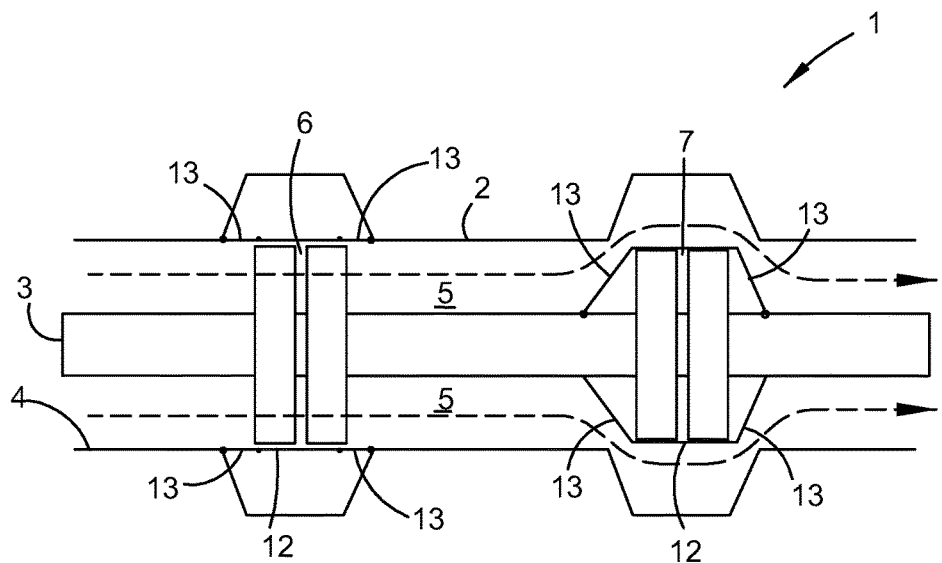
FIG. 4 is a schematic diagram showing the flow path of a working fluid when the flow passage is in the first active configuration and the fluid is flowing in a first direction.
Figure 5:
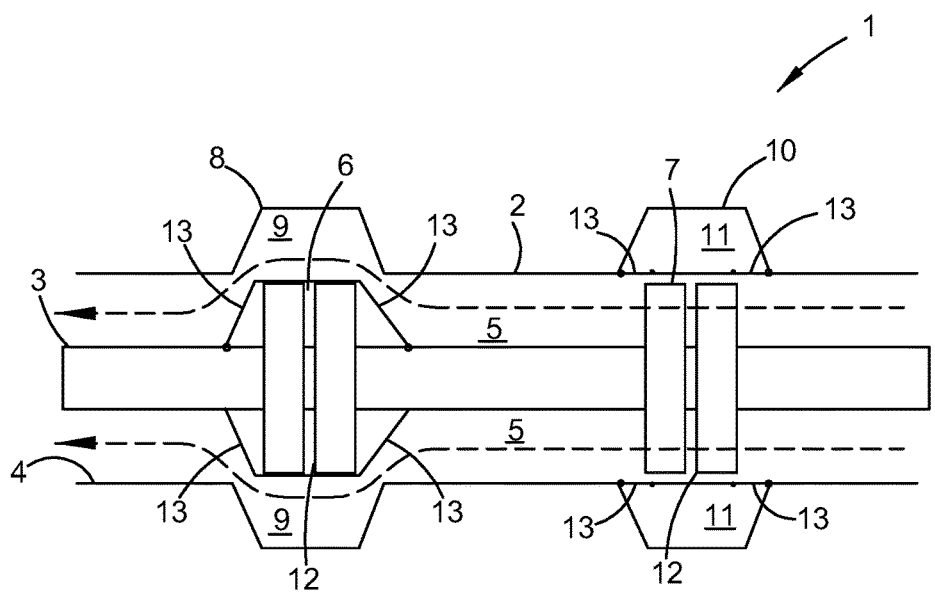
FIG. 5 is a schematic diagram showing the flow path of a working fluid when the flow passage is in the second active configuration and the fluid is flowing in a second direction.

The gate-type mechanisms 12 enable the active configuration of the flow passage to be selectively changed between a first active configuration as shown in FIGS. 2 and 4, and a second active configuration as shown in FIG. 5.

In the first active configuration, the upstream and downstream arrays of gate members 13 associated with the first stator-rotor module 6 are moved to their respective first position substantially flush with the outer frame 4 to close the first bypass passage 9. In this first active configuration, the working fluid can flow through the first stator to act on and rotate the first rotor. The upstream and downstream gate members 13 of the second stator-rotor module 7 are in the second position extending across the flow passage to open the second bypass passage 11 such that the working fluid bypasses the second stator-rotor module 7. It will be appreciated that the first active configuration is adopted when the airflow is flowing from left-to-right in the orientation shown in FIGS. 2 and 4.

Referring now to FIG. 5, the second active configuration is adopted when the airflow changes to a right-to-left airflow for the orientation shown in the figure. In this configuration, the upstream and downstream arrays of gate members 13 associated with the second stator-rotor module 7 are moved to their respective first position substantially flush with the outer frame 4 to close the second bypass passage 9. In this second active configuration, the working fluid can flow through the second stator to act on and rotate the second rotor. The upstream and downstream gate members 13 of the first stator-rotor module 6 are in their respective second position extending across the flow passage to open the first bypass passage 9 such that the working fluid bypasses the first stator-rotor module 6.

From the above description, it will be appreciated that, due to the change in direction of the working fluid arising from its oscillations, the stator of each energy conversion module (6, 7) will be downstream of the respective rotor for the associated flow direction of the working fluid.

The stators are adapted to deviate the course or flowpath of the working fluid to facilitate rotation of the associated rotor in a predetermined direction. In particular, the first and second stator-rotor modules (6, 7) are configured such that both rotors rotate in the same direction.

A doubled-ended electric generator 14 is disposed within the inner frame 3 and coupled to both the first and second rotors via respective drive shafts 15. Accordingly, the first rotor drives the electric generator when the flow control means configures the flow passage into the first active configuration and the airflow is in the first direction. The second rotor drives the electric generator when the flow control means configures the flow passage into the second active configuration and the airflow is in the second direction. It will be appreciated that this single direction of rotation of the rotors and thus the electric generator provides advantageous improvements in the efficiency of generating electricity from on oscillating water column. In particular, it has been found that improvements in efficiency in the range of about 20 to 25% can be achieved with certain preferred embodiments of this turbine.

Figure 6:
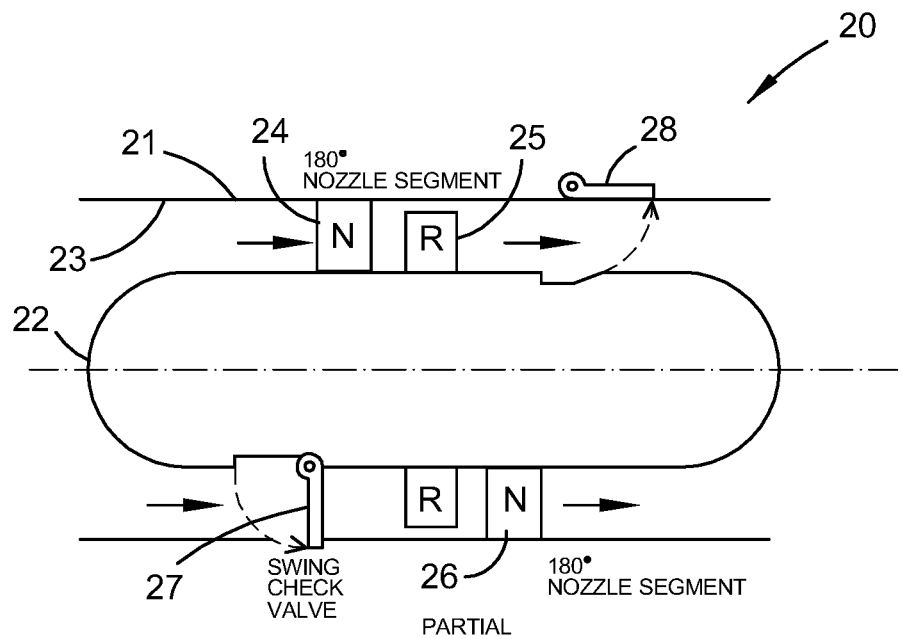
FIG. 6 is a schematic diagram of a side view of second embodiment of a turbine according to the invention.
Figure 7:
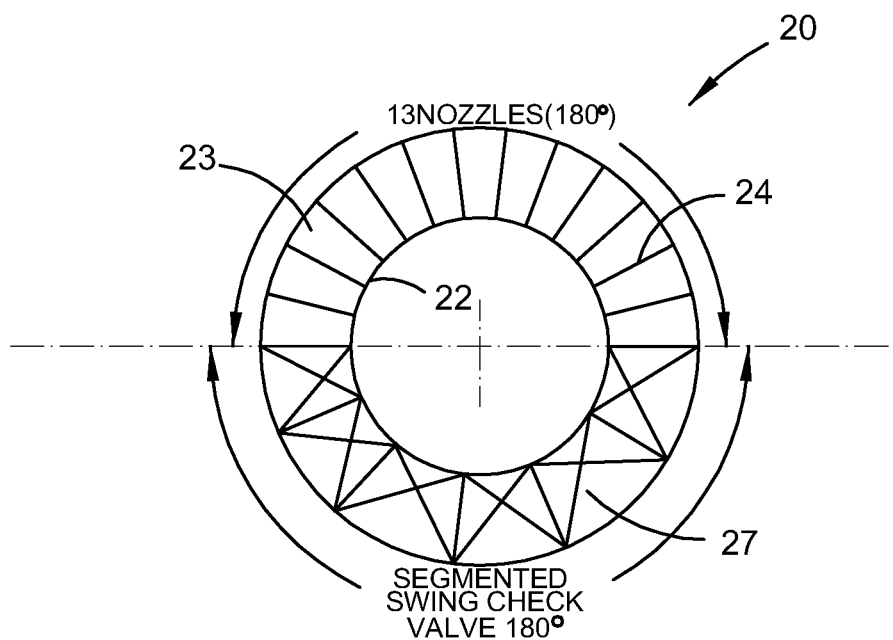
FIG. 7 is an end view of the turbine of FIG. 6, in which a portion of the flow passage is occluded by a flow control mechanism.
Figure 8:
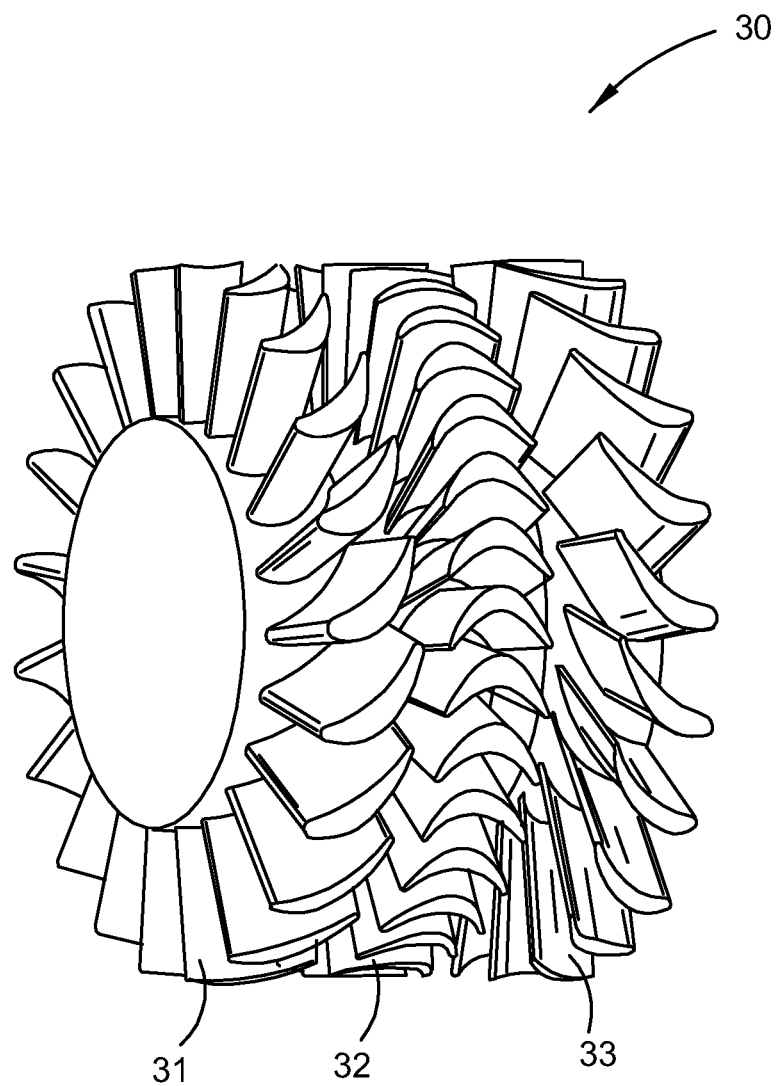
FIG. 8 is a perspective view of a third embodiment of a turbine according to the invention, having a stator-rotor-stator arrangement.
Figure 9:
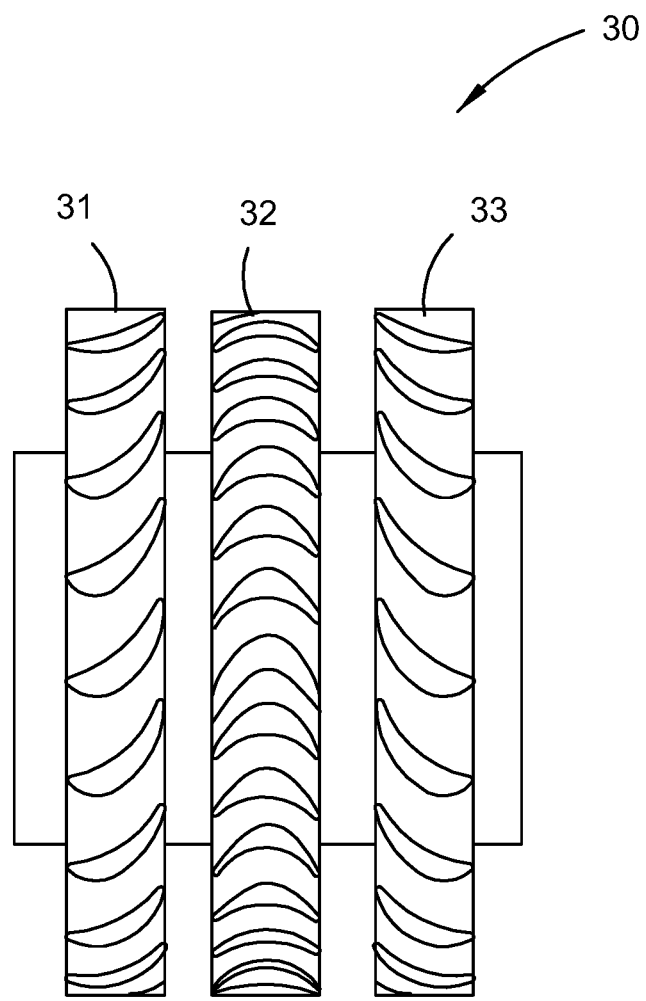
FIG. 9 is a side view of the turbine of FIG. 8.
Figure 10:
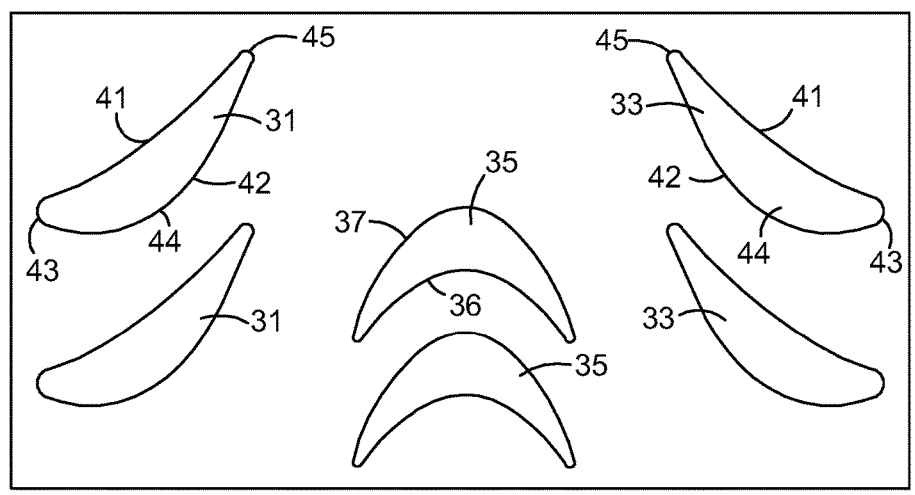
FIG. 10 is a schematic view showing an axial representation of the arrangement of the blades/guide vanes of the turbine of FIG. 8.
Figure 11:
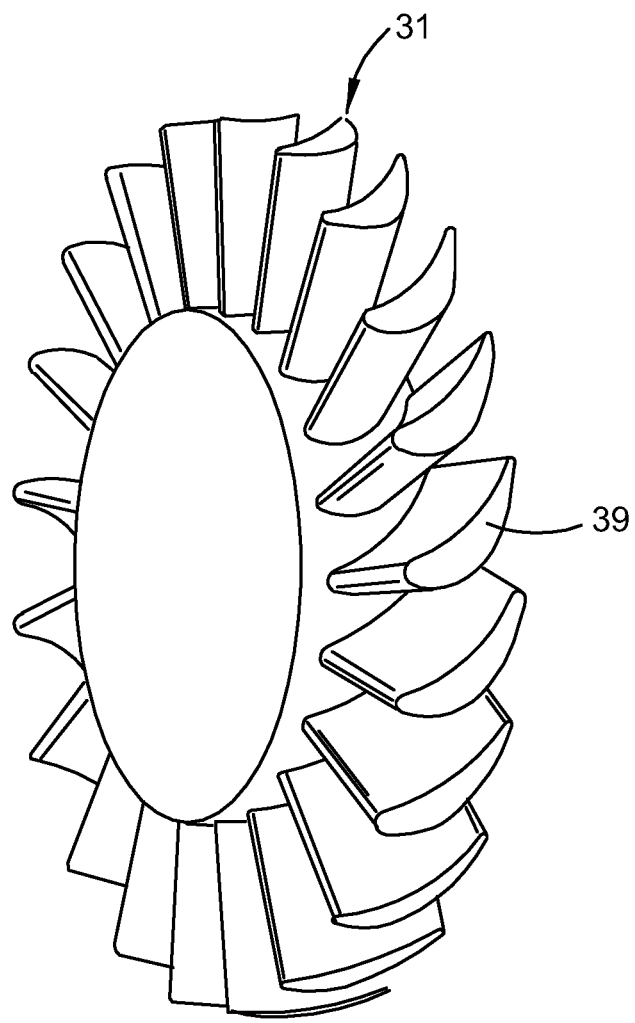
FIG. 11 is a perspective view of the inlet stator of the turbine of FIG. 8.
Figure 12:
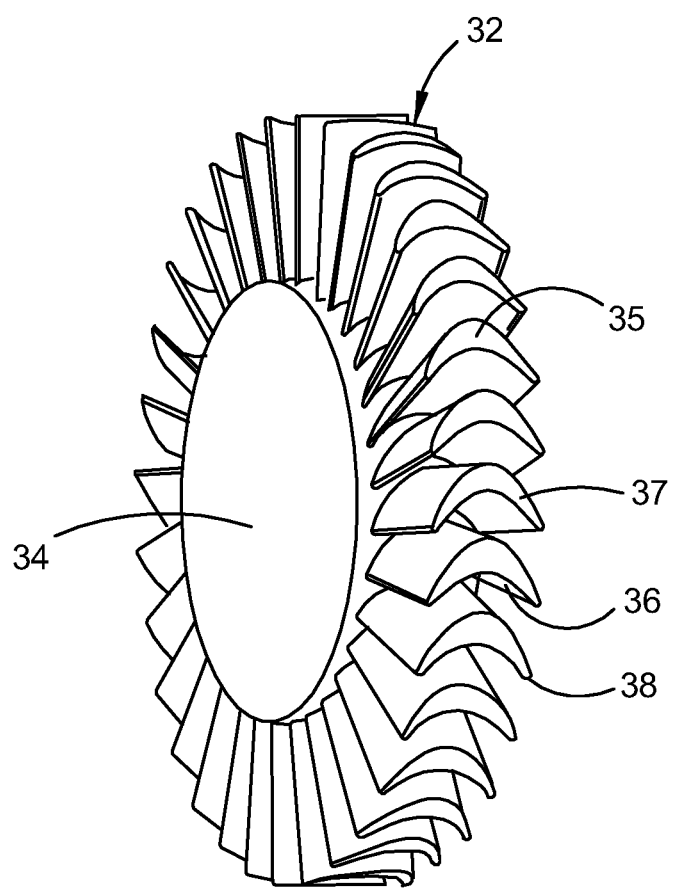
FIG. 12 is a perspective view of the rotor of the turbine of FIG. 8.
Figure 13:
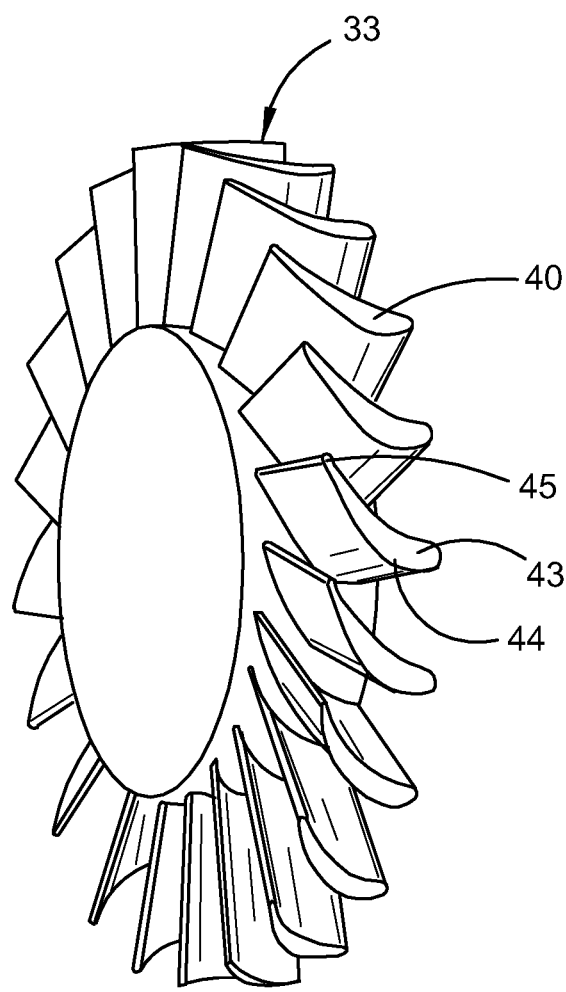
FIG. 13 is a perspective view of the exhaust stator of the turbine of FIG. 8.
Figure 14:
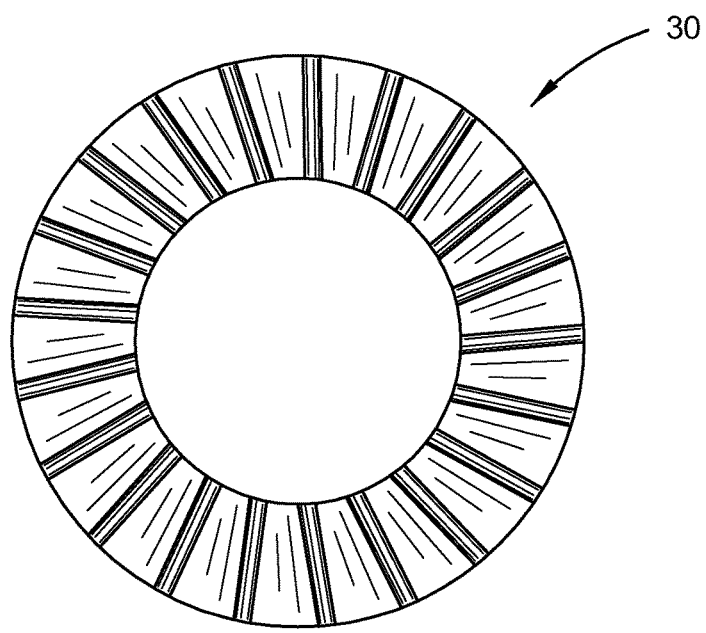
FIG. 14 is an end view of the inlet stator of FIG. 11.
Figure 15:
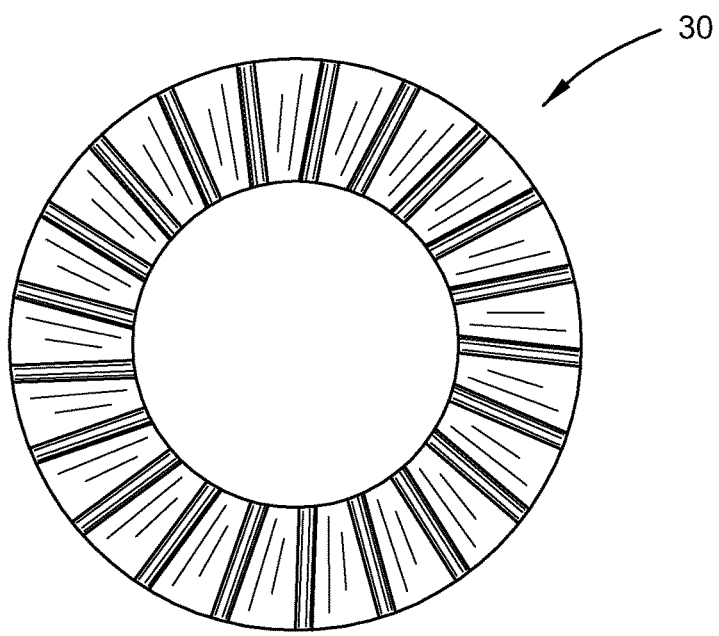
FIG. 15 is an end view of the exhaust stator of FIG. 13.

Referring now to the embodiment of FIGS. 6 and 7, the invention provides a turbine 20 for extracting energy from an oscillating working fluid such as an oscillating airflow produced by an oscillating water column of an ocean wave energy extraction system.

The turbine 20 includes a housing 21 having an inner frame 22 and an outer frame 23 to define a flow passage for the working fluid therebetween. The inner and outer frames are generally cylindrical such that the cross-section of the flow passage is in the form of an annulus.

An energy conversion unit having a first stator or nozzle 24, a rotor 25 have a plurality of blades, and a second stator or nozzle 26 is disposed in the housing 21.

The first stator 24 is arranged on a first side of the rotor 25 and includes a plurality of guide vanes arranged in a semi-circular arch formation for directing air flowing towards the first stator 24 towards a pressure side of the rotor blades to rotate the rotor.

The second stator 24 is arranged on an opposite second side of the rotor 25 and includes a plurality of guide vanes arranged in a semi-circular arch formation for directing air flowing towards a pressure side of the rotor blades to rotate the rotor. The semi-circular nozzle arch formation of the second stator is preferably offset by approximately 180 degrees relative to the arch formation of the first stator 24.

Flow control means in the form of a gate-type mechanism is provided for changing the configuration of the flow passage. The gate-type mechanism includes a first set of gate members 27 arranged on the same side of the rotor 25 as the first stator 24, and a second set of gate members 28 arranged on the opposite second side of the rotor 25.

Each set of gate members (27, 28) is arranged in a semicircular arch formation and offset by 180 degrees relative to the associated stator. The gates members are hingedly connected so as to be movable to a closed position to close off a portion (in this case, half) of the opening to the flow passage, when the working fluid is flowing towards that end of the turbine. By closing off a portion of the flow passage, the working fluid is admitted only through the open section of the flow passage, via the stator, to act on and rotate the rotor in a predetermined direction. When the direction of airflow changes, the set of gate members on the first side of the rotor open, and the set of gate members of the opposite second side of the rotor close, or vice versa. That is, depending on the direction of airflow, the upstream gates members open and the downstream gate members are closed.

The rotor is configured such that it rotates in the same direction, irrespective of the direction of airflow.

Referring now to the embodiment of FIGS. 8 to 15, a third embodiment of a turbine according to the invention is illustrated. In this embodiment the turbine 30 is provided with an inlet stator 31, a rotor 32 and an outlet stator 33.

The rotor 32 has an central hub 34 which defines an axis of rotation of the rotor. A plurality of symmetrical blades 35 are arranged about and extend from a periphery of the hub 34. Each blade 35 has a generally crescent-shaped or arcuate cross-sectional profile having a concave surface 36 and a convex surface 37. The blades 35 are arranged about the hub 34 such that concave surfaces 36 are configured as a pressure side of the blades, and the convex surfaces 37 are configured as the suction side of the blades.

The cross-sectional profile of each crescent-shaped blade 35 converges such that each blade 35 has substantially parallel outer tip edges 38. The outer tip edges 38 of each blade preferably have a smooth contoured profile or an otherwise rounded profile, devoid of sharp or pointed edges. In certain embodiments, each outer tip edge 38 has a predetermined radius of curvature.

The inlet stator 31 has a plurality of guide vanes 39 and is arranged adjacent to the rotor 32 for directing the working fluid towards the pressure side 35 of the rotor blades 34. The inlet guide vanes 39 direct the working fluid towards the rotor blades 34 at a predetermined or desired flow angle.

The outlet stator 33 has a plurality of exit guide vanes 40 and is arranged adjacent to the rotor 32 for directing an exhaust flow away from the rotor.

It will be appreciated that the inlet that the inlet and outlet stators are configured such that their roles are reversible to facilitate operation with a bidirectional or oscillating fluid flow. That is, for an airflow from the inlet end, the inlet guide vanes will direct the airflow towards the pressure side of the rotor blades, and for an for an airflow from the outlet end, the outlet guide vanes will direct the airflow towards the pressure side of the rotor blades such that the rotor always rotates is a single direction.

Each inlet and outlet guide vane (39, 40) has an asymmetrical cambered cross-sectional profile having a concave surface 41 and a convex surface 42.

Each guide (39, 40) has a leading edge 43, a midsection 44, and a trailing edge 45. The midsection 44 of each vane is preferably closer to the leading edge 43, than the trailing edge 45, when the vane is acting as an inlet vane.

The leading and trailing edges have substantially smooth contoured or otherwise rounded profile such that each vane is devoid of sharp or pointed edges, wherein the radius of curvature of the leading edge is greater than the radius of curvature of the trailing edge.

Accordingly, the present invention, at least in its preferred embodiments, provides a robust turbine of increased efficiency. The turbine advantageously enables increased amounts of energy to be extracted from an oscillating or bidirectional working fluid. In particular, in certain preferred forms of the turbine, increases in efficiency in the range of up to about 20% compared to turbines currently used in ocean wave energy extraction systems can advantageously be achieved. In these and other respects, the invention in its preferred embodiments, represents a practical and commercially significant improvement over the prior art.

Although the invention has been described with reference to specific examples, it will be appreciated by those skilled in the art that the invention may be embodied in many other forms.

The invention claimed is:

1. A turbine for extracting energy from an oscillating working fluid, the turbine including:
   a housing defining a flow passage for the working fluid;
   an energy conversion unit disposed in the housing;
   a first nozzle for directing working fluid flowing in a first predetermined direction towards a first operating section of the energy conversion unit, the first nozzle being arranged upstream of the energy conversion unit when the working fluid is flowing in the first predetermined direction;
   a second nozzle for directing working fluid flowing in a second predetermined direction towards a second operating section of the energy conversion unit, the second nozzle being arranged upstream of the energy conversion unit when the working fluid is flowing in the second predetermined direction; and
   a flow control mechanism adapted to be selectively movable to occlude a predetermined portion of the flow passage such that the working fluid is directed to act on the first or the second operating section of the energy conversion unit,
   wherein the first and second nozzles are arranged on geometrically opposed halves of a cross-section of the flow passage and on opposite sides of the energy conversion unit.

2. A turbine according to claim 1, wherein, in use, the flow control mechanism changes the configuration of the flow passage in response to changes in the direction of flow of the working fluid.

3. A turbine according to claim 1, wherein the flow control mechanism has a first control mechanism on a first side of the energy conversion unit and a second control mechanism on a second side of the energy conversion unit.

4. A turbine according to claim 3, wherein, when the working fluid is flowing in the first predetermined direction, the first control mechanism occludes the predetermined portion on the first side of the flow passage so that the working fluid can act on only the first operating section of the energy conversion unit; and when the working fluid is flowing in the second predetermined direction, the second control mechanism occludes the predetermined portion on the second side of the flow passage so that the working fluid can act on only the second operating section of the energy conversion unit.

5. A turbine according to claim 3, wherein the first and second control mechanisms are rotatable between respective occluding and open positions, thereby to enable the configuration of the flow passage to be changed.

6. A turbine according to claim 5, wherein the first control mechanism includes a rotatable element and the second control mechanism includes a rotatable element.

7. A turbine according to claim 6, wherein the rotatable elements correspond in shape to at least a portion of the cross-section of the flow passage.

8. A turbine according to claim 7, wherein the rotatable elements are semicircular shaped discs.

9. A turbine according to claim 6, wherein the rotatable elements are offset by 180 degrees relative to each other such that they occlude the opposite halves of the cross-section of the flow passage.

10. A turbine according to claim 9, wherein both rotatable elements rotate simultaneously through 180 degrees relative to each other in response to changes in the direction of fluid flow from the first predetermined direction to the second predetermined direction, such that the working fluid can act on the first and second operating sections of the energy conversion unit, respectively.

11. A turbine according to claim 3, wherein the first control mechanism includes a first gate-type mechanism movable between an open position and a closed position for occluding a first portion of the flow passage, and the second control mechanism includes a second gate-type mechanism movable between an open position and a closed position for occluding a second portion of the flow passage.

12. A turbine according to claim 11, wherein the first and second gate-type mechanisms include a segmented array of gates.

13. A turbine according to claim 1, wherein the first nozzle includes a plurality of guide vanes arranged so as to have a circumferential extent of approximately 180 degrees around the cross-section of the flow passage.

14. A turbine according to claim 1, wherein the second nozzle includes a plurality of guide vanes arranged so as to have a circumferential extent of approximately 180 degrees around the cross-section of the flow passage.

15. A turbine according to claim 1, wherein the housing has an inner housing and an outer housing arranged such that the cross-section of the flow passage is an annulus.

16. A turbine according to claim 1, wherein the energy conversion unit includes a rotor supported for rotation within the flow passage.

17. A turbine according to claim 16, wherein the rotor is adapted for rotation in a single direction, the direction of rotation being independent of the direction of flow of the working fluid.

18. A turbine according to claim 16, wherein the rotor has a central hub and a plurality of blades arranged about and extending from the periphery of the hub such that the plurality of blades are disposed within the flow passage.

19. A turbine according to claim 18, wherein the rotor is arranged to be substantially normal to the direction of fluid flow such that the rotor rotates about an axis substantially parallel to a longitudinal axis of the housing.

20. A turbine according to claim 18, wherein each blade has a pressure side surface and a suction side surface.

21. A turbine according to claim 20, wherein the pressure side surface of each blade is concave and each suction side surface is convex.

22. A turbine according to claim 16, wherein the first and second operating sections of the energy conversion unit are each a predetermined portion of the rotor.

23. A turbine according to claim 22, wherein the first and second operating sections are predetermined circumferential extents of the rotor.

24. A turbine according to claim 23, wherein the first and second operating sections are each approximately one half of an operating surface of the rotor.

25. A turbine according to claim 22, wherein the first and second operating sections are each a predetermined number of sequential rotor blades.

* * * * *